United States Patent [19]
Ejima et al.

[11] Patent Number: 5,627,589
[45] Date of Patent: May 6, 1997

[54] IMAGING APPARATUS WITH CCD HOLDERS

[75] Inventors: Satoshi Ejima, Tokyo; Osamu Inoue, Yokohama, both of Japan

[73] Assignee: Nikon Corporation, Tokyo, Japan

[21] Appl. No.: 602,265

[22] Filed: Feb. 20, 1996

Related U.S. Application Data

[63] Continuation of Ser. No. 341,992, Nov. 16, 1994, abandoned, which is a continuation of Ser. No. 240,805, May 11, 1994, abandoned, which is a continuation of Ser. No. 955,255, Oct. 1, 1992, abandoned.

[30] Foreign Application Priority Data

Oct. 7, 1991 [JP] Japan ................................ 3-287042

[51] Int. Cl.⁶ ........................................... H04N 5/225
[52] U.S. Cl. ................................ 348/340; 348/375
[58] Field of Search .................................. 348/207, 335, 348/337, 340, 344, 375; 354/286, 288; 403/12, 13, 268, 269, 166, 305, 306, 361; 359/811, 815, 819; H04N 5/225

[56] References Cited

U.S. PATENT DOCUMENTS 4,734,778  3/1988  Kobayashi et al. ............... 358/229
4,896,217  1/1990  Miyazawa et al. .............. 358/213.11

FOREIGN PATENT DOCUMENTS 61-245772  11/1986  Japan ......................... H04N 5/225
1-175372    7/1989  Japan ......................... H04N 5/225
2-140067    5/1990  Japan ......................... H04N 5/225
2-152376    6/1990  Japan ......................... H04N 5/335
WO9215172   3/1992  WIPO ......................... H04N 5/225

*Primary Examiner*—Andrew Faile
*Assistant Examiner*—Tuan V. Ho
*Attorney, Agent, or Firm*—Shapiro and Shapiro

[57] ABSTRACT

An imaging apparatus comprising imaging devices for converting the light of a subject into electric signals, an image forming device for forming an image of the light of the subject on the imaging devices and a connecting device for connecting the image forming device to the imaging devices. In the imaging apparatus, the connecting device has at least three pins so inserted in holes bored in either the imaging devices or the image forming device as to be vertically movable and a biasing device for making the pins contact with a confronting surface of the image device or the image forming device. Heads of the pins are formed in configuration adaptive to point-contact with the confronting surface. The hole is bonded to the pin, and the pin is bonded to the confronting surface, respectively.

19 Claims, 6 Drawing Sheets

IMAGING APPARATUS WITH CCD HOLDERS

This is a continuation of application Ser. No. 08/341,992 filed Nov. 16, 1994, which is a continuation of application Ser. No. 08/240,805 filed May 11, 1994, which is a continuation of application Ser. No. 07/955,255 filed Oct. 1, 1992, all now abandoned.

BACKGROUND OF THE INVENTION

1. Field of the Invention

The present invention relates to an imaging apparatus such as an electronic still camera including an imaging device for converting the light of a subject into electric signals.

2. Related Background Art

FIG. 1 is a sectional view showing one example of a conventional imaging apparatus which employs a CCD defined as a solid state image sensing device. FIG. 2 is a sectional view taken substantially along the arrowed line II—II of FIG. 1.

Referring to these Figures, the numeral 1 represents an image forming unit including a plurality of lenses. A quarter-wave plate 2 and a beam splitter 3 are disposed in rear of (right side in FIG. 1) of this image forming unit 1. This beam splitter 3 is fixedly bonded to the upper surface of a holding member 6 assuming a plane-parallel configuration. The holding member 6 is placed on a mounting surface 7b formed at the rear part (right side in FIG. 1) of a housing 7 and fixed with machine screws 8. Each machine screw 8 is inserted into a through-hole 7a penetrating the mounting surface 7b of the housing 7. The image forming unit 1 is fixed to the front part of the housing 7 by use of a machine screw 13.

Further, two CCDs 4, 5 are respectively provided upwardly and backwardly (right side in FIG. 1) of the beam splitter 3 through crystal filters 11, 12. The CCDs 4, 5 are, as known well, composed of a multiplicity of pixels arrayed one-dimensionally or two-dimensionally. These CCDs 4, 5 and crystal filters 11, 12 are fixed respectively to CCD holding members 9, 10 with machine screws 29. These CCD holding members 9, 10 (only the CCD holding member 9 is depicted) are attached to the housing 7 through height adjusting washers 15 as well as through machines screws 14.

Next, an imaging operation of the thus constructed imaging apparatus will be explained.

The quarter-wave plate 2 removes vertical and horizontal components of linearly polarized light, luminous fluxes of which have been condensed in the image forming unit 1. Subsequently, some of the luminous fluxes are reflected upwards by the beam splitter 3, penetrate the crystal filter 11 and are thereafter incident on the CCD 4. On the other hand, the luminous fluxes which have passed through the beam splitter 3 penetrate the crystal filter 12 and are incident on the CCD 5. Then, luminance information is read from the CCD 4 by means of an unillustrated electric circuit, while color information is read from the CCD 5. The information is also recorded in an unillustrated recording medium.

In the imaging apparatus described above, positional adjustments of the CCDs 4, 5 are important. As explained before, the luminance information is read from the CCD 4, while the color information is read from the CCD 5. Hence, if the positions of the CCDs 4, 5 deviate, it may happen that the luminance and colors of the different pixels correspond to each other when reproducing a color image on the basis of the luminance and color information. This may lead to a possibility that the image quality declines.

The positional adjustments of the CCDs 4, 5 require an adjusting allowance on the order of 1 mm at the maximum depending on variation caused when manufacturing the CCDs, 4, 5. Then, an accuracy of the positional adjustment is required to be less than or equal to a half of a dimension of a minor side of each of the pixels constituting the CCDs 4, 5 in terms of preventing the luminance and colors of different pixels from corresponding to each other. As one example, when a dimension of the minor side of the pixel is set to 4 µm, the accuracy of the positional adjustment is required to be ±2 µm or less. This is, it can be understood, a highly accurate positional adjustment.

The positional adjustments of the CCDs 4, 5 have hitherto involved the steps of determining the reference plane in the optical axis direction by use of a collimator (level vial) and properly selecting a thickness of the height adjusting washer 15; and, in the direction orthogonal to the optical axis, i.e., the direction along the light receiving surfaces of the CCDs 4, 5 the adjustments are made by effecting the positioning by use of a jig (illustration is omitted).

For the positional adjustments of the CCDs 4, 5 in the conventional imaging apparatus, however, it is required that the height adjusting washer 15 having an adequate thickness corresponding to each of the CCDs 4, 5 be properly selected every time the positional adjustment is performed. The workability of fabrication is not favorable, and it takes a long time for the work. Besides, there arises such a problem that a well-experienced operator is needed for selecting the washer 15. Further, when clamping the machine screw 14, the CCDs 4, 5 themselves are moved by this clamping force. This results in such a problem that the highly accurate positional adjustments are hard to perform.

Proposed as a means for obviating those problems was a technique of inserting a wedge member in a gap between the CCD and a spectral prism, positioning the CCDs by protruding or retracting this wedge member and thereafter fixing the CCDs with a bonding agent (Japanese Patent Laid-Open Application No. 2-140067). Alternatively, there was proposed a technique of connecting a solid state image sensing device directly to a prism by soldering (Japanese Patent Laid-Open Application No. 2-152376).

However, the technique of fixing the CCDs to the spectral prism with the bonding agent presents the following problems. Considering the adjusting allowances of the CCDs, it is necessary to secure the maximum bonding agent thickness on the order of 1 mm. When a thick bonding agent layer is provided as described above, and if the shrinkage factor concomitant with the hardening of the bonding agent is approximately 5%, there is a possibility in which the CCDs move as much as 50 µm at the maximum. This causes a problem wherein a sufficient accuracy of the positional adjustment can not be secured. On the other hand, the technique of connecting the solid state image sensing device directly to the prism also has a similar problem because of the solder being shrunk with a cool-off of the solder.

SUMMARY OF THE INVENTION

It is a general object of the present invention to provide an imaging apparatus exhibiting a good mounting accuracy of imaging devices and facilitating a mounting process, wherein the imaging devices are connected to an image forming device by bonding.

An explanation is given by making a correspondence to FIGS. 3 through 5 showing one embodiment. The present invention is applied to an imaging apparatus comprising: imaging devices 4, 5 for converting the light of a subject into electric signals; an image forming device 1 for forming an image of the light of the subject on the imaging devices 4, 5; and a connecting device 21 for connecting the image forming device 1 to the imaging devices 4, 5.

The above-described object is accomplished by the following arrangement. The connecting device 21 has at least three pins 24 so inserted in holes 23a bored in either the imaging devices 4, 5 or the image forming device 1 as to be vertically movable and a biasing device for making these pins 24 contact with a confronting surface 25a of the imaging devices 4, 5 or the image forming device 1. Heads 24c of the pins 24 are formed in configurations adaptive to point-contact with the confronting surface 25a. The hole 23a is bonded to the pin 24, and the pin 24 is bonded to the confronting surface 25a.

Further, in the above-mentioned imaging apparatus according to the present invention, the imaging devices 4, 5 include a plurality of pixels assuming a substantially rectangular shape, and the following relation is given:

$$D-d<50\times H$$

where d is the diameter of the pin, D is the diameter of the hole, and H is the dimension of the minor side of the pixel.

Even when a bonding layer interposed between the hole 23a and the pin 24 is hardened, this shrinkage force is dispersively offset in the peripheral direction of the bonding layer. Hence, the movements of the pins 24 concomitant with the shrinkages of the bonding layers are sufficiently small as compared with sizes of gaps between the holes 23a and the pins 24. On the other hand, even when the bonding layers interposed between the pins 24 and the imaging devices 4, 5 or the imaging device 1 are hardened and shrunk, these pins 24 directly contact the confronting surface 25a of the imaging devices 4, 5 or the imaging device 1. The movements of the imaging devices concomitant with the shrinkages of the bonding layers are small enough to be ignorable.

BRIEF DESCRIPTION OF THE DRAWINGS

Other objects and advantages of the present invention will become apparent during the following discussion taken in conjunction with the accompanying drawings, in which.

DETAILED DESCRIPTION OF THE PREFERRED EMBODIMENTS (First Embodiment)

Figure 1:
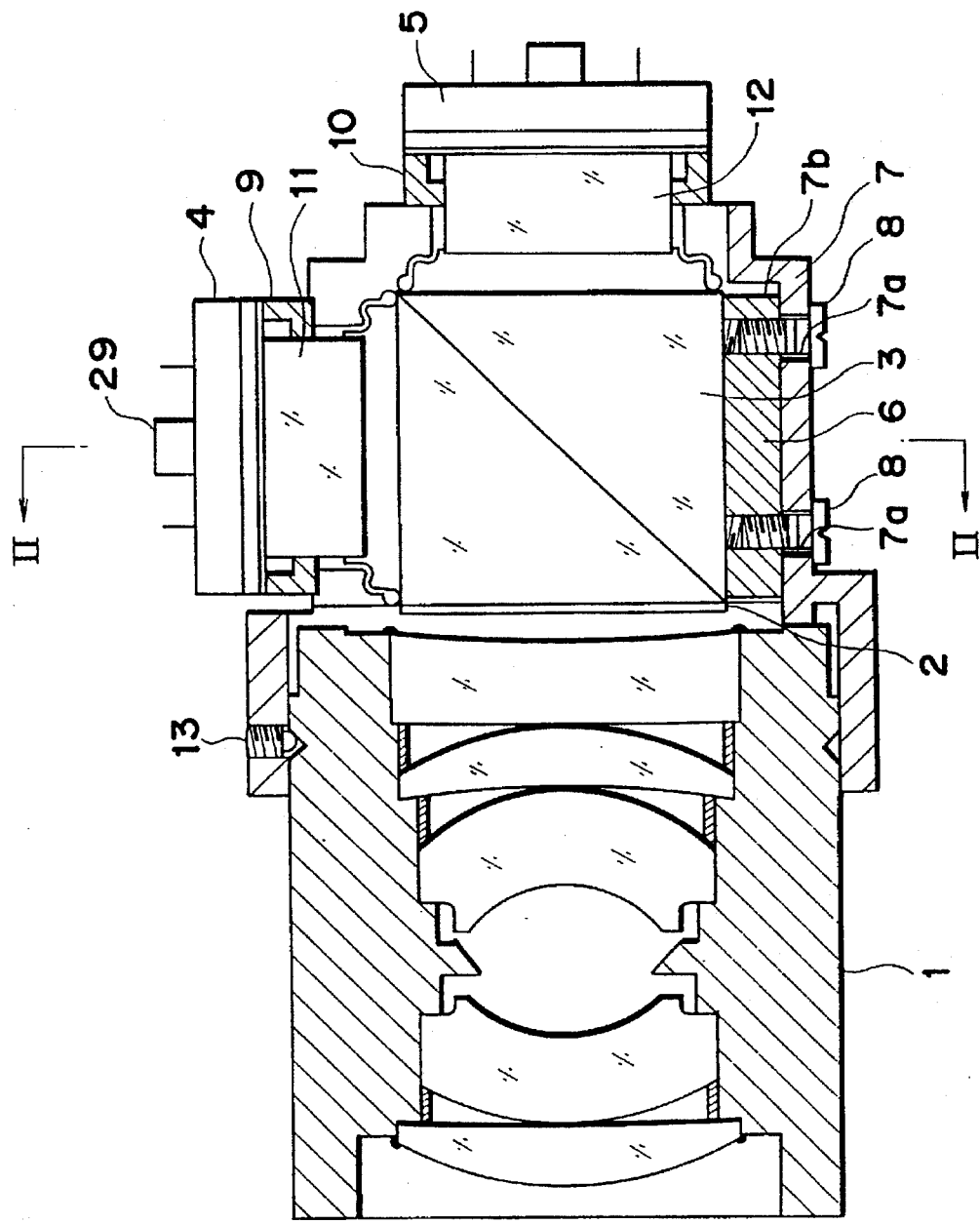
FIG. 1 is a sectional view illustrating one example of a conventional imaging apparatus.
Figure 2:
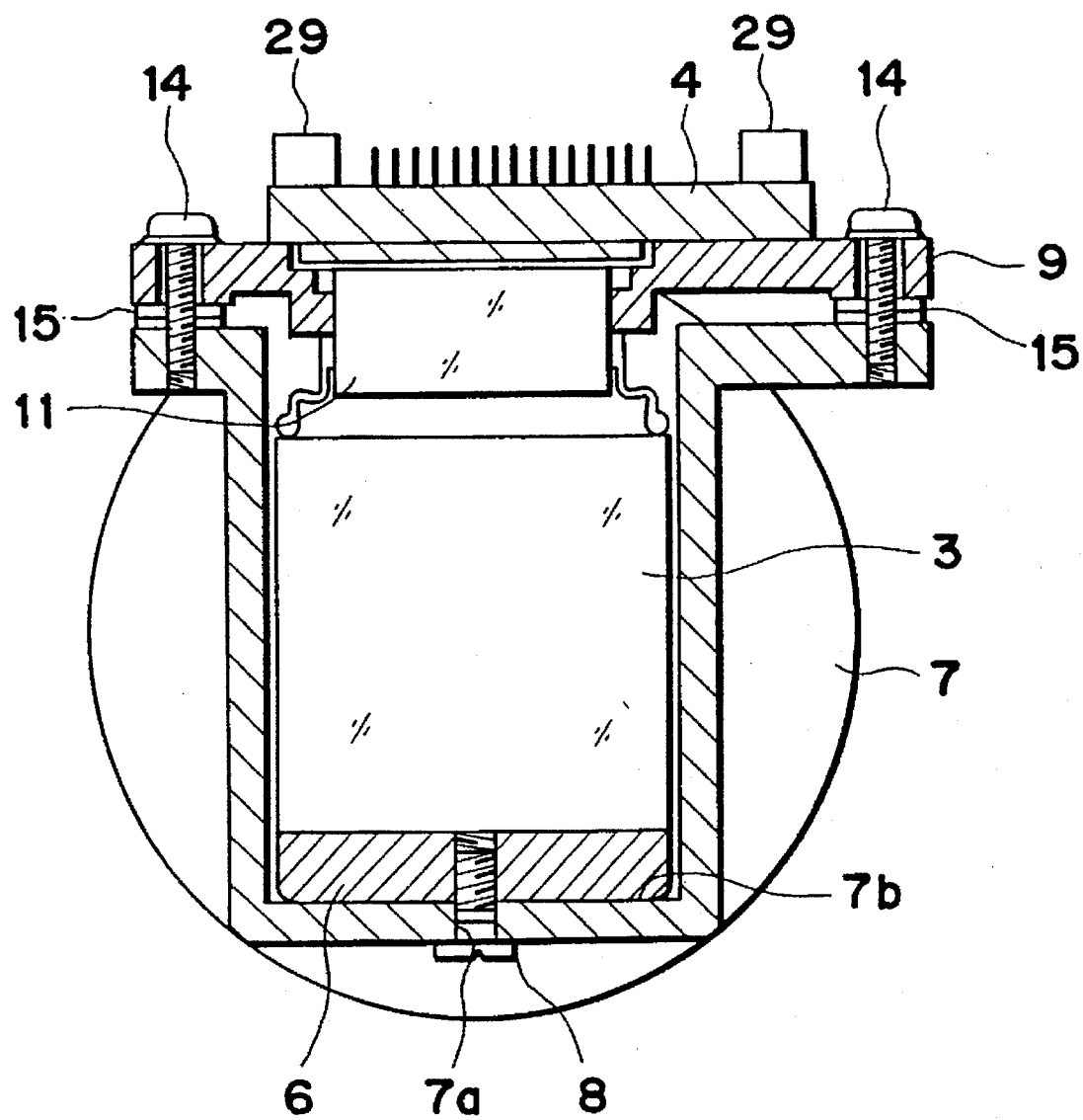
FIG. 2 is a sectional view taken substantially along the arrowed line II—II of FIG. 1.
Figure 3:
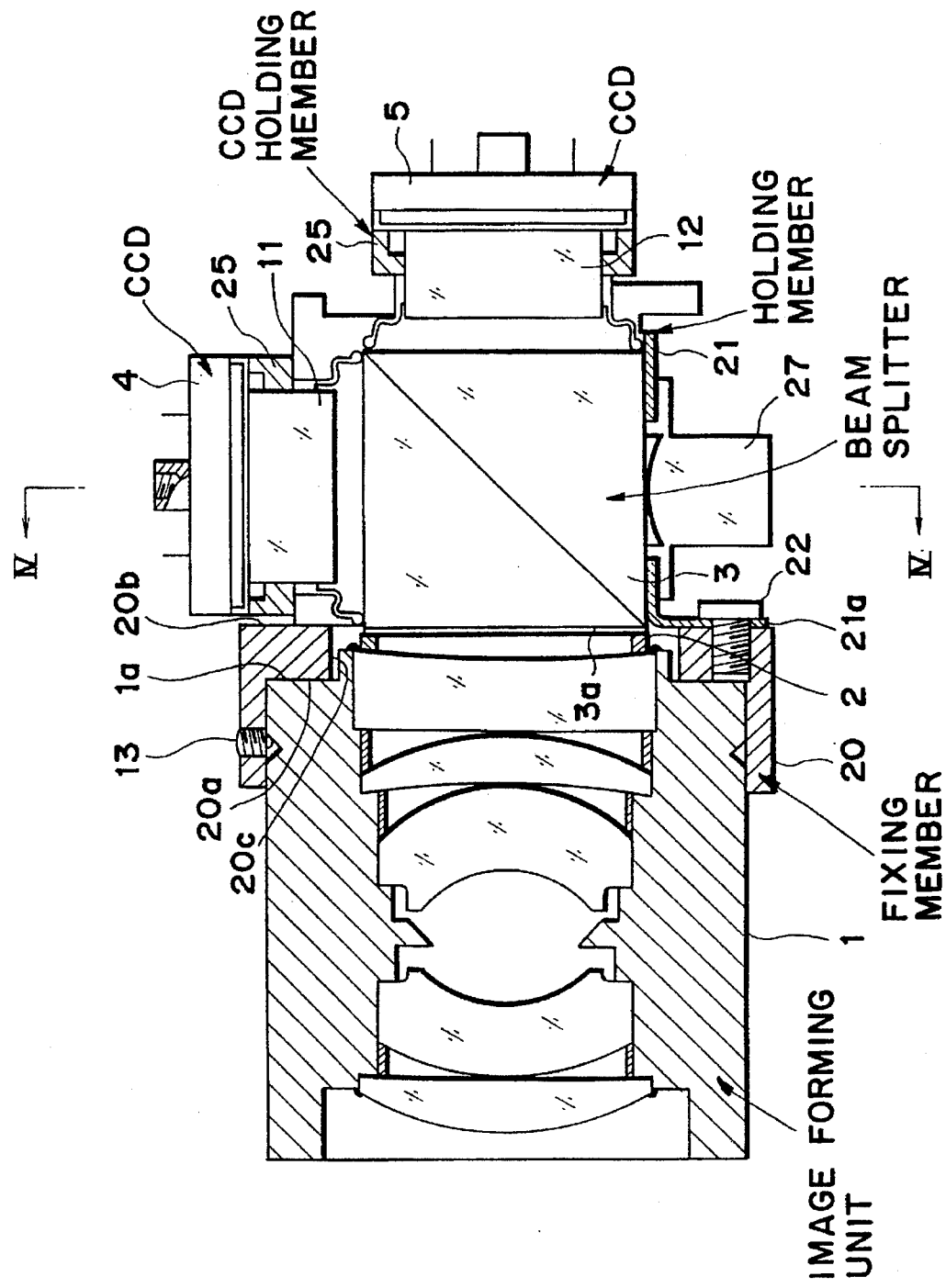
FIG. 3 is a sectional view of an imaging apparatus, showing a first embodiment of the present invention.
Figure 4:
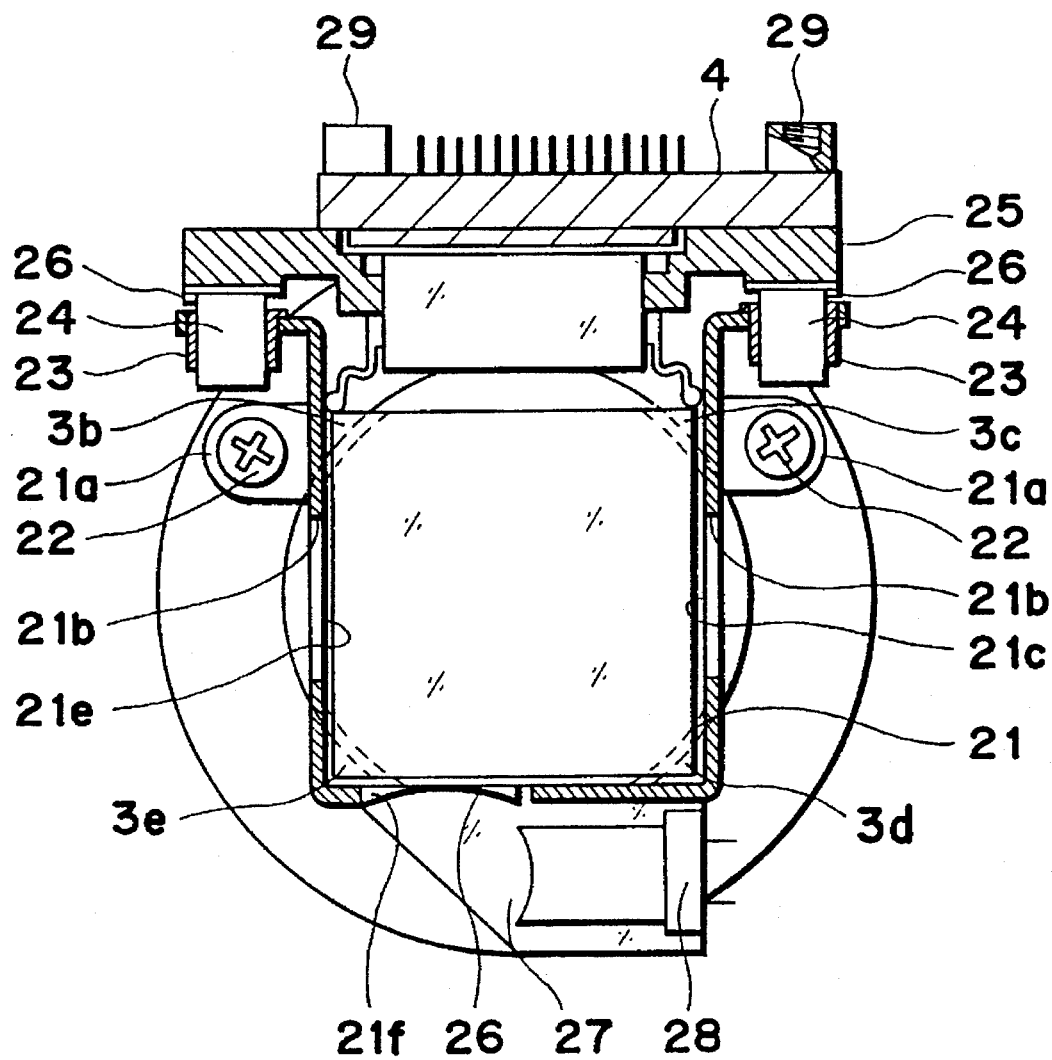
FIG. 4 is a sectional view taken substantially along the line IV—IV of FIG. 3.
Figure 5:
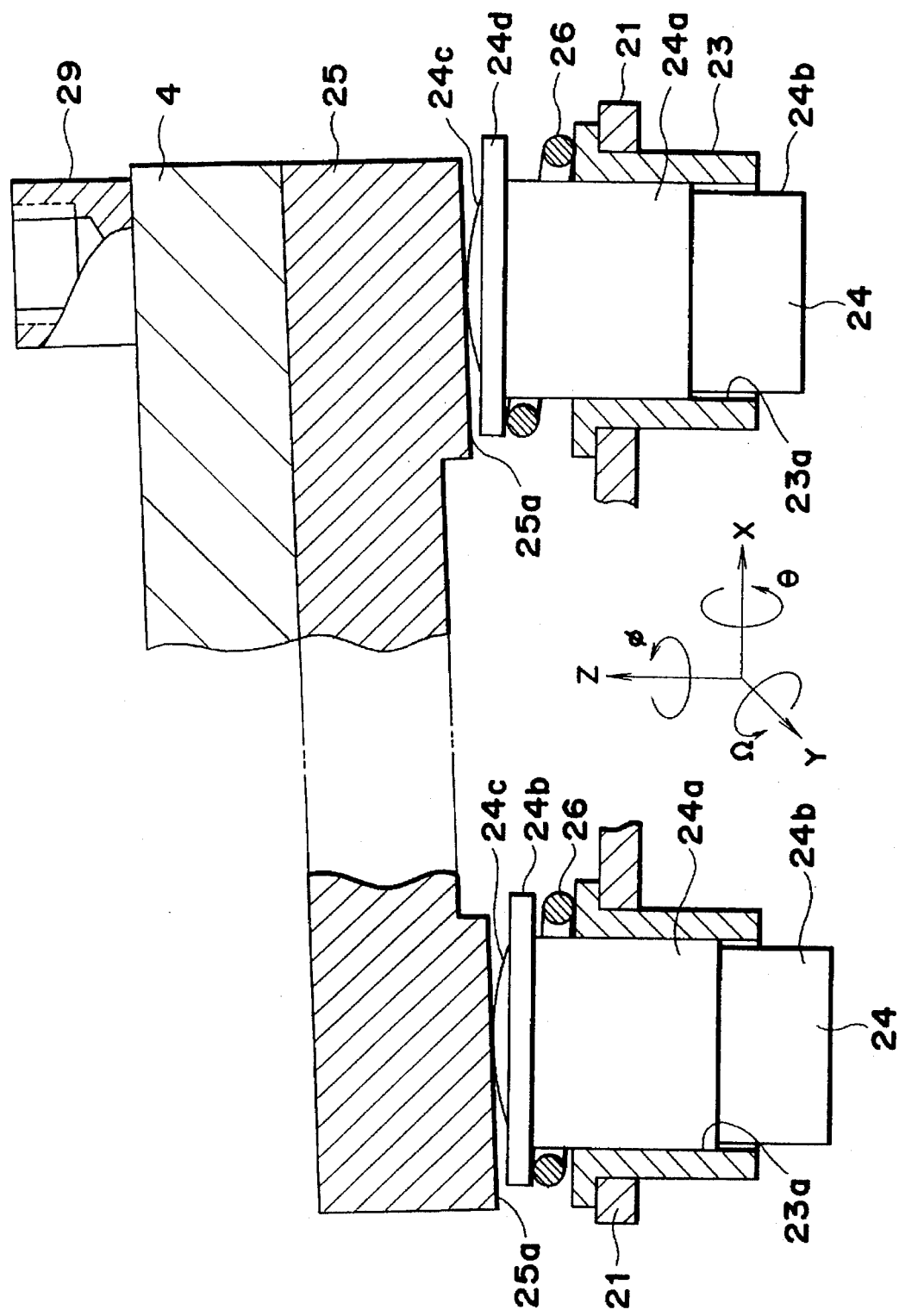
FIG. 5 is an enlarged sectional view depicting only a CCD mounting unit.

FIG. 3 is a sectional view showing a first embodiment of an imaging apparatus according to the present invention. FIG. 4 is a sectional view taken substantially along the arrowed line IV—IV of FIG. 3. FIG. 5 is an enlarged sectional view illustrating only a CCD mounting unit. Note that in the following discussion, the same components as those in the conventional example described above are marked with like symbols, and the explanations thereof will be simplified.

Referring to these figures, a rear part (right end portion in FIG. 3) of an image forming unit 1 is inserted into a fixing member 20. A holding member 21 for holding a beam splitter 3 is fixed to this fixing member 20. The fixing member 20 is formed in a bottomed cylindrical shape. The bottom thereof is formed with a through-hole 20c. A contact surface 20a conceived as a bottom surface thereof contacts a contact surface 1a formed at the rear part of the image forming unit 1.

The holding member 21 is formed in a substantially U-like configuration in section which opens upwards (see FIG 4). The beam splitter 3 is accommodated in an interior of the holding member 21. Mounting portions 21a extending outwards are formed in three locations at the front end (left end in FIG. 3) of this holding member 21. These mounting portions 21a are fixed to a contact surface 20b of the fixing member 20 through machine screws 22, thus mounting the holding member 21 to the rear part of the fixing member 20. Note that in FIG. 4 the symbol 21b denotes a bonding agent injection hole formed in a side portion of the holding member 21, and the symbols 21c–21e designate small projections formed in the interior of the holding member 21. The beam splitter 3 is in a point-contact state with respect to the holding member 21 through these small projections 21c–21e. Therefore, even if the holding member 21 is more or less distorted, this does not exert influences on the inclination of the beam splitter 3. Further, referring to FIGS. 3 and 4, the symbol 21f indicates an emission hole formed in the bottom of the holding member 21.

A quarter-wave plate 3 (left end surface in FIG. 3) stuck to an incidence surface 3a defined as a front surface (left end surface in FIG. 3) of the beam splitter 3 has four notched corners confronting the contact surface 20b of the fixing member 20. Hence, four corners 3b–3e of the incidence surface 3a of the beam splitter 3 are exposed to the outside. Then, the four exposed corners 3b–3e of the beam splitter 3 directly contact the contact surface 20b of the cylindrical member 20, thereby effecting the positioning between the incidence surface 3a of the beam splitter and the optical axis of the image forming unit 1 at a high accuracy. Note that an air gap between the beam splitter 3 and the holding member 21 is filled with the unillustrated bonding agent so as not to cause a deviation of the relative positions thereof.

Further, as in the same way with the conventional example, CCDs 4, 5 are provided upwardly and backwardly (right side in FIG. 3) of the beam splitter 3 through crystal filters 11, 12. These CCDs 4, 5 and crystal filters 11, 12 are respectively fixed to a CCD holding member 25 with machine screws 29. Cylindrical sleeves 23 are, as illustrated in FIGS. 4 and 5, fixedly provided upwardly and backwardly of the holding member 21. Pins 24 each assuming a substantially cylindrical shape are fitted in holes 23a defined by the sleeves 23.

Each pin 24 is, as depicted in FIG. 5, composed of: a pin body 24a fitted in the sleeve 23 with an infinitesimal gap (on the order of e.g., 100 μm); a pin bottom 24b formed to have a diameter slightly smaller than that of this pin body 24a; a spherically shaped pin head 24c; and a flange portion 24d formed between the pin body 24a and the pin head 24c. The bonding agent is charged in between the pin body 24a and the sleeve 23, thereby fixing the pin 24 to the sleeve 23. The, pin head 24c directly contacts the bottom surface 25a of the CCD holding member 25. In this state, the bonding agent is charged in between the flange portion 24d and the bottom surface 25a of CCD holding member, thereby fixing the pin 24 to the CCD holding member 25. The number of the pins 24 is not limited to three. When having at least three pins 24, the CCD holding member 25 is stabilized on a specific plane.

Designated by 26 is a spring provided between the flange portion 24d of the pin 24 and the sleeve 23. The numeral 27 represents a condenser lens, disposed at the bottom of the holding member 21, for condensing the reflected light from the CCDs 4, 5 via the emission hole 21f; and a photo transistor 28 provided on the downstream side of the condenser lens 27.

Note that in the claim-to-embodiment correspondence, an image forming means comprises the image forming unit 1, the beam splitter 3, the fixing member 20 and the holding member 21; an imaging means comprises of the CCDs 4, 5 and the CCD holding member 25; a confronting surface is provided by the CCD holding member bottom surface 25a; and a connecting means comprises the pin 24 and the spring 26.

The following is an explanation of the way of fabricating the imaging apparatus constructed as described above.

To start with, the holding member 21 incorporating the beam splitter 3 is secured to the fixing member 20 by use of three machine screws 22. Then, the incidence surface 3a of the beam splitter 3 and the contact surface 20b of the cylindrical member 20 contact each other. In this state, the beam splitter 3 is fixedly bonded to the holding member 21. The bonding process involves the use of a bonding agent which fills the air gap relative to the beam splitter 3 via a bonding bore 21b formed in the holding member 21.

Upon a completion of mounting of the beam splitter 3, the condenser lens 27 is fixedly bonded to the bottom of the holding member 21, and the photo transistor 28 is mounted. Then, the cylindrical member 20 is fastened to the image forming unit 1 with a machine screw 13. The CCDs 4, 5 united with the CCD holding member 25 through machine screws 29 are moved while being chucked by a robot or the like. The CCDs are then adjusted to the best positions by employing a collimator, etc.

The CCDs 4, 5 held on the pins 24 are, as illustrated in FIG. 5 (in FIG. 5, however, only the CCD 4 is shown), movable in X-axis, Y-axis and Z-axis directions orthogonal to each other in an orthogonal coordinate system and also in directions θ, φ and Ω rotating about these axes. Note that the Z-axis is taken in the optical axis direction of a light beam incident on the CCD 4. Each pin 24 is fitted in the cylindrical sleeve 23 and also biased upwards constantly by a spring 26. Hence, even when the CCD 4 (and the CCD holding member 25 integral therewith) is moved in a direction Z or rotated in the directions θ and Ω, the pin 24 moves up and down. A contact state between this pin 24 and the CCD holding member 25 is kept. Similarly, even when the CCD 4 moves in the directions X and Y or rotates in the direction φ, the pin 24 slides on the bottom surface 25a of the CCD holding member 25, thereby keeping the contact state therebetween. In this manner, the contact state between the pin 24 and the CCD holding member 25 is maintained irrespective of the movement and rotation of the CCD 4.

Upon a completion of the positional adjustments of the CCDs 4, 5, there are bonded the sleeve 23, the pin 24 and the CCD holding member 25. To be specific, while chucking the CCDs 4, 5 and the CCD holding member 5, the bonding agent is at first injected from the pin bottom 24b and fills a gap between the pin 24 and the sleeve 23. The bonding agent injected from the pin bottom 24b permeates a narrow gap between the pin body 24a and the sleeve 23 by dint of a surface tension thereof. Hardened first is the bonding agent permeating between the pin body 24a and the sleeve 23. The bonding agent between the pin bottom 24b and the sleeve 23 is sequentially hardened. Subsequently, the bonding agent is injected from the outer periphery of the flange portion 24d of the pin 24 and fills a gap between the pin 24 and the CCD holding member bottom surface 25a. In this way, the pin 24 is bonded to the CCD holding member 25; and the pin 24 is bonded to the sleeve 23. Positions of the CCDs 4, 5 are thus fixed.

On this occasion, a bonding layer between the pin 24 and the sleeve 23 assumes a substantially cylindrical shape, and hence a shrinkage force concomitant with the hardening of the bonding agent is dispersively offset in the peripheral direction of the bonding layer. Accordingly, the movements of the pin 24 in the directions X and Y with respect to the sleeve 23 are small as compared with the gap between the sleeve 23 and the pin 24. On the other hand, it may be considered that the movement of the pin 24 in the direction Z is substantially 0, because the Z-directional shrinkage force does not act on the pin 24 even if the bonding layer shrinks. Further, from the discussion given above, it may follow that the rotational quantities of the pin 24 in the directions θ, Ω and φ are also almost ignorable.

Next, even when the bonding layer between the pin 24 and the CCD holding member 25 shrinks after being hardened because of the pin 24 directly contacting the CCD holding member 25, between which the bias of spring 26 is interposed, there is nothing but to cause a slight elastic deformation on an interface between the pin 24 or the CCD holding member 25 and the bonding layer. The quantities of X-directional movement and θ-and Ω directional rotations of the CCD holding member 25 relative to the pin 24 are almost ignorable. Further, it may be considered that the movements and rotations in directions other than the abovementioned are substantially 0, because the shrinkage force concomitant with the hardening of the bonding layer does not act.

Hence, in accordance with this embodiment, even in the case of adjusting the positions of the CCDs 4, 5 and fixing them with the bonding agent, the mounting positions of the CCDs 4, 5 move and rotate very small in terms of quantity due to the shrinkage concomitant with the hardening of the bonding agent. It is therefore possible to mount and fix the CCDs 4, 5 at a high accuracy. The imaging apparatus with a less deterioration of the image quality can be thereby readily actualized. Besides, the mounting and fixing processes are simpler than in the prior art. The fixation and mounting thereof can be completed in a short time with a good workability.

Given now concretely is a contemplation about a relation between the shrinkage of the bonding layer and the gap between the sleeve 23 and the pin 24. As discussed above, the moving quantities of the CCDs 4, 5 in the directions X and Y due to the shrinkages of the bonding layers may be restrained down to less than or equal to a half of dimension H in the minor-side direction of the pixel of the CCD. Therefore, a thickness of the bonding layer—i.e., a gap ΔD as a difference between a diameter d of the pin body 24a and a diameter D of the sleeve 23 (hole 23a)—has to satisfy a relation of the following formula.

$$\Delta D < (H/2) \times (100/\eta) \tag{1}$$

where η: bonding agent shrinkage factor (percentage). As explained above, this shrinkage force is dispersively offset in the peripheral direction of the bonding layer, depending also on the shrinkage of the bonding layer. A gap ΔDr for a practical use can be taken five times at the maximum (preferably three times) as large as ΔD of the formula (1). Hence, the formula (1) is transformed such as:

$$\Delta Dr < H \times 250/\eta$$

(Preferably $\Delta Dr < H \times 150/\eta$) (2)

The shrinkage factor of a generally employed non-volatile bonding agent is 5% or under, and hence:

$$\Delta Dr < 50 \times H$$

(Preferably $\Delta Dr < 30 \times H$) (3)

Herein, when the minor-side-directional dimension of the pixel of the CCD is set to 4 μm, ΔDr may be less than 200 μm (preferably 120 μm). It can be understood that the CCDs can be mounted and fixed with high accuracy while keeping a sufficient gap.

(Second Embodiment)

Figure 6:
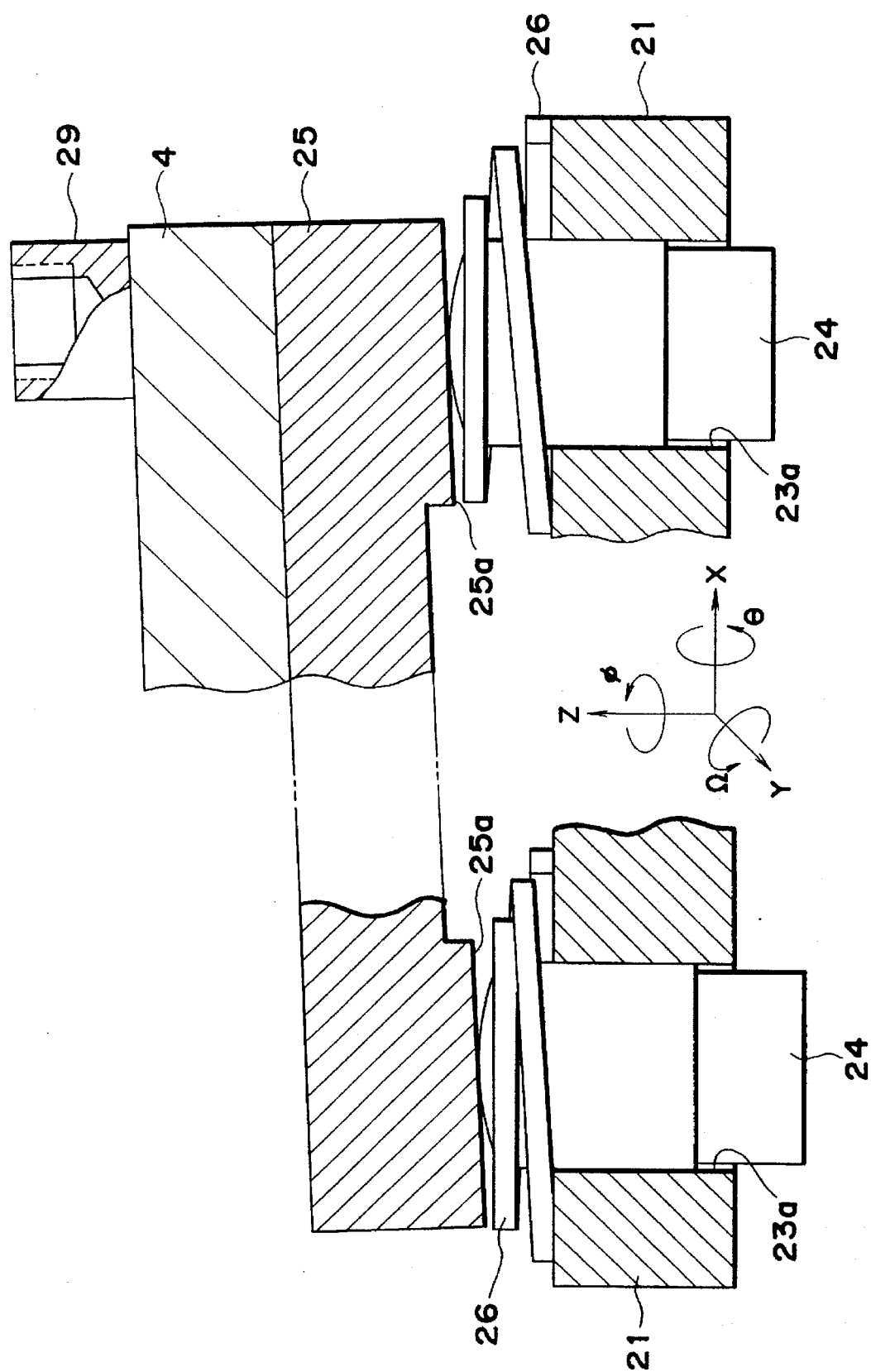
FIG. 6 is an enlarged sectional view of the imaging apparatus in a second embodiment of the present invention, illustrating only the CCD mounting unit.

FIG. 6 is an enlarged sectional view of a CCD mounting unit, showing a second embodiment of the imaging apparatus according to the present invention. In this embodiment, the holding unit 21 is united with the sleeve and, the pin 24 and the spring 26 are integrally formed by use of a synthetic resin. Hence, in accordance with this embodiment also, the same action and effect as those in the first embodiment are obtainable.

Note that the details of the imaging apparatus according to the present invention are not limited to those in the embodiment discussed above, but many variant forms are practicable. As one example, the sleeve 23 (hole 23a) is provided on the side of the holding member 21, and the pin 24 is fitted thereinto, thus bringing it in contact with the CCD holding member 25. However, reversely the sleeve 23 may be provided on the side of the CCD holding member 25, and the pin 24 may contact the holding member 21.

Further, the embodiment discussed above has dealt with the imaging apparatus constructed by using two CCDs 4, 5. An imaging apparatus employing one or three or more CCDs may be available. Moreover, image sensing devices other than the CCD may also be usable.

As fully explained above, according to the present invention, even when fixing the imaging devices with the bonding agent while adjusting the positions of the imaging devices with respect to, e.g., the fixed image forming device, the mounting positions of the imaging devices move and rotate very small in terms of quantity due to the shrinkage concomitant with the hardening of the bonding agent. Therefore, the imaging devices can be mounted and fixed with high accuracy. An imaging apparatus with less deterioration of the image quality can be readily actualized. Also, the mounting and fixing processes are simpler than in the prior art. The fixation and mounting can be completed in a short time with a good workability.

Although the illustrative embodiments of the present invention have been described in detail with reference to the accompanying drawings, it is to be understood that the present invention is not limited to those embodiments. Various changes or modification may be effected by one skilled in the art without departing from the scope or spirit of the invention.

What is claimed is:

1. An imaging apparatus comprising:

imaging means for converting an image formed by light of a subject into electric signals;

image forming means for forming an image of the light of said subject; and connecting means for connecting said image forming means to said imaging means so that said imaging means is substantially perpendicular to an optical axis of said image forming means;

said imaging means having at least three holes;

said connecting means having at least three pins slidable in said holes along respective axes of said holes, resilient biasing means for biasing heads of said at least three pins against a confronting surface provided on said image forming means, and a bonding agent bonding said pins to surfaces defining said holes and bonding said pins to said confronting surface;

said heads of said pins being formed in a configuration adaptive to point-contact with said confronting surface.

2. An apparatus according to claim 3, wherein said imaging means has a plurality of substantially rectangular pixels, and wherein said apparatus satisfies the following relation:

$$D-d<50 \times H$$

wherein d is the diameter of each pin, D is the diameter of each hole, and H is the dimension of a minor side of each pixel.

3. An imaging apparatus comprising:

an imaging device to convert an image formed by light of a subject into electric signals;

an image forming device to form an image of the light of said subject; and a connecting device to connect said image forming device to said imaging device so that said imaging device is substantially perpendicular to an optical axis of said image forming device;

said imaging device having at least three holes;

said connecting device having at least three pins slidable in said holes along respective axes of said holes, a resilient biasing device to bias heads of said at least three pins against a confronting surface provided on said image forming device, and a bonding agent bonding said pins to surfaces defining said holes and bonding said pins to said confronting surface;

said heads of said pins being formed in a configuration adaptive to point-contact with said confronting surface.

4. An imaging apparatus comprising:

an imaging device to convert an image formed by light of a subject into electric signals;

an image forming device to form an image of the light of said subject; and a connecting device to connect said image forming device to said imaging device so that said imaging device is substantially perpendicular to an optical axis of said image forming device;

said imaging device having at least three holes;

said connecting device having at least three pins slidable in said holes along axes of said holes, a resilient biasing device to bias heads of said at least three pins against a confronting surface provided on said image forming device, and a bonding agent bonding said pins to surfaces defining said holes and bonding said pins to said confronting surface;

said heads of said pins being formed in a configuration adaptive to point-contact with said confronting surface.

5. An imaging apparatus comprising:

imaging means for converting an image formed by light of a subject into electric signals;

image forming means for forming an image of the light of said subject;

connecting means for connecting said image forming means to said imaging means so that said imaging means is substantially perpendicular to an optical axis of said image forming means;

said imaging means having at least three holes; and said connecting means having at least three pins slidable in said holes along axes of said holes, and slidable on a confronting surface provided on said image forming means and means for connecting said pins to surfaces defining said holes and for connecting said pins to said confronting surface provided on said image forming means.

6. An imaging apparatus according to claim 5, wherein said means for connecting said pins to said surfaces defining said holes and for connecting said pins to said confronting surface fixes said pins to said surfaces defining said holes and to said confronting surface.

7. An imaging apparatus comprising:

imaging means for converting an image formed by light of a subject into electric signals;

image forming means for forming an image of the light of said subject; and connecting means for connecting said image forming means to said imaging means so that said imaging means is substantially perpendicular to an optical axis of said image forming means;

said image forming means having at least three holes;

said connecting means having at least three pins slidable in said holes along respective axes of said holes, resilient biasing means for biasing heads of said at least three pins against a confronting surface provided on said imaging means, and a bonding agent bonding said pins to surfaces defining said holes and bonding said pins to said confronting surface;

said heads of said pins being formed in a configuration adaptive to point-contact with said confronting surface.

8. An imaging apparatus comprising:

an imaging device to convert an image formed by light of a subject into electric signals;

an image forming device to form an image of the light of said subject; and a connecting device to connect said image forming device to said imaging device so that said imaging device is substantially perpendicular to an optical axis of said image forming device;

said image forming device having at least three holes;

said connecting device having at least three pins slidable in said holes along respective axes of said holes, a resilient biasing device to bias heads of said at least three pins against a confronting surface provided on said imaging device, and a bonding agent bonding said pins to surfaces defining said holes and bonding said pins to said confronting surface;

said heads of said pins being formed in a configuration adaptive to point-contact with said confronting surface.

9. An imaging apparatus comprising:

an imaging device to convert an image formed by light of a subject into electric signals;

an image forming device to form an image of the light of said subject; and a connecting device to connect said image forming device to said imaging device so that said imaging device is substantially perpendicular to an optical axis of said image forming device;

said image forming device having at least three holes;

said connecting device having at least three pins slidable in said holes along axes of said holes, a resilient biasing device to bias heads of said at least three pins against a confronting surface provided on said imaging device, and a bonding agent bonding said pins to surfaces defining said holes and bonding said pins to said confronting surface;

said heads of said pins being formed in a configuration adaptive to point-contact with said confronting surface.

10. An imaging apparatus comprising:

imaging means for converting an image formed by light of a subject into electric signals;

image forming means for forming an image of the light of said subject;

connecting means for connecting said image forming means to said imaging means so that said imaging means is substantially perpendicular to an optical axis of said image forming means;

said image forming means having at least three holes; and said connecting means having at least three pins slidable in said holes along axes of said holes, and slidable on a confronting surface provided on said imaging means, and means for fixing said pins to surfaces defining said holes and for fixing said pins to said confronting surface provided on said imaging means.

11. An imaging apparatus comprising:

imaging means for converting an image formed by light of a subject into electric signals;

image forming means for forming an image of the light of said subject;

connecting means for connecting said image forming means to said imaging means so that said imaging means is substantially perpendicular to an optical axis of said image forming means;

said imaging means having at least three holes; and said connecting means having at least three pins which are slidable in said holes along axes of said holes and which are slidable on a confronting surface provided on said image forming means in association with a relative movement of said imaging means and said image forming means, and means for connecting said pins to surfaces defining said holes and for connecting said pins to said confronting surface provided on said image forming means.

12. An imaging apparatus according to claim 11, wherein said means for connecting said pins to said surfaces defining said holes and for connecting said pins to said confronting surface fixes said pins to said surfaces defining said holes and to said confronting surface.

13. An imaging apparatus comprising:

imaging means for converting an image formed by light of a subject into electric signals;

image forming means for forming an image of the light of said subject;

connecting means for connecting said image forming means to said imaging means so that said imaging means is substantially perpendicular to an optical axis of said image forming means;

said image forming means having at least three holes; and said connecting means having at least three pins which are slidable in said holes along axes of said holes and which are slidable on a confronting surface provided on said imaging means in association with a relative movement of said imaging means and said image forming means, and means for fixing said pins to surfaces defining said holes and for fixing said pins to said confronting surface provided on said imaging means.

14. An imaging apparatus comprising:

an imaging device to convert an image formed by light of a subject into electric signals;

an image forming device to form an image of the light of said subject;

a connecting device to connect said image forming device to said imaging device so that said imaging device is substantially perpendicular to an optical axis of said image forming device;

said imaging device having at least three holes; and said connecting device having at least three pins slidable in said holes along axes of said holes, and slidable on a confronting surface provided on said image forming device and a connecting member to connect said pins to surfaces defining said holes and to connect said pins to said confronting surface provided on said image forming device.

15. An imaging apparatus according to claim 14, wherein said connecting member is adapted to fix said pins to said surfaces defining said holes and to said confronting surface.

16. An imaging apparatus comprising:

an imaging device to convert an image formed by light of a subject into electric signals;

an image forming device to form an image of the light of said subject;

a connecting device to connect said image forming device to said imaging device so that said imaging device is substantially perpendicular to an optical axis of said image forming device;

said image forming device having at least three holes; and said connecting device having at least three pins slidable in said holes along axes of said holes, and slidable on a confronting surface provided on said imaging device, and a fixing member to fix said pins to surfaces defining said holes and to fix said pins to said confronting surface provided on said imaging device.

17. An imaging apparatus comprising:

an imaging device to convert an image formed by light of a subject into electric signals;

an image forming device to form an image of the light of said subject;

a connecting device to connect said image forming device to said imaging device so that said imaging device is substantially perpendicular to an optical axis of said image forming device;

said imaging device having at least three holes; and said connecting device having at least three pins which are slidable in said holes along axes of said holes and which are slidable on a confronting surface provided on said image forming device in association with a relative movement of said imaging device and said image forming device, and a connecting member to connect said pins to surfaces defining said holes and to connect said pins to said confronting surface provided on said image forming device.

18. An imaging apparatus according to claim 17, wherein said connecting member is adapted to fix said pins to said surfaces defining said holes and to said confronting surface.

19. An imaging apparatus comprising:

an imaging device to convert an image formed by light of a subject into electric signals;

an image forming device to form an image of the light of said subject;

a connecting device to connect said image forming device to said imaging device so that said imaging device is substantially perpendicular to an optical axis of said image forming device;

said image forming device having at least three holes; and said connecting device having at least three pins which are slidable in said holes along axes of said holes and which are slidable on a confronting surface provided on said imaging device in association with a relative movement of said imaging device and said image forming device, and a fixing member to fix said pins to surfaces defining said holes and to fix said pins to said confronting surface provided on said imaging device.

* * * * *